United States Patent
Rotem et al.

(10) Patent No.: US 11,625,443 B2
(45) Date of Patent: Apr. 11, 2023

(54) WEB DOCUMENT ENHANCEMENT

(71) Applicant: Snap Inc., Santa Monica, CA (US)

(72) Inventors: Efrat Rotem, Haifa (IL); Ariel Krieger, Tel-Aviv (IL); Emmanuel Merali, Tel-Aviv (IL)

(73) Assignee: Snap Inc., Santa Monica, CA (US)

( * ) Notice: Subject to any disclaimer, the term of this patent is extended or adjusted under 35 U.S.C. 154(b) by 249 days.

(21) Appl. No.: 14/730,336

(22) Filed: Jun. 4, 2015

(65) Prior Publication Data

US 2015/0356190 A1    Dec. 10, 2015

Related U.S. Application Data

(60) Provisional application No. 62/138,551, filed on Mar. 26, 2015, provisional application No. 62/007,974, filed on Jun. 5, 2014.

(51) Int. Cl.
*G06F 16/9535* (2019.01)
*H04L 67/02* (2022.01)
(Continued)

(52) U.S. Cl.
CPC ........ *G06F 16/9535* (2019.01); *G06F 16/285* (2019.01); *G06F 16/951* (2019.01);
(Continued)

(58) Field of Classification Search
CPC .......... G06F 17/30867; G06F 16/9535; G06F 16/285; G06F 16/958; G06F 16/951; G06F 40/20; G06Q 50/01; H04L 67/02
(Continued)

(56) References Cited

U.S. PATENT DOCUMENTS 666,223 A    1/1901   Shedlock
4,581,634 A  4/1986   Williams
(Continued)

FOREIGN PATENT DOCUMENTS

CA   2887596 A1   7/2015
EP   2051480 A1   4/2009
(Continued)

OTHER PUBLICATIONS

European Search Report and the European Search Opinion dated Sep. 21, 2015 From the European Patent Office Re. Application No. 15170647.0.
(Continued)

*Primary Examiner* — Allen S Lin
(74) *Attorney, Agent, or Firm* — Schwegman Lundberg & Woessner, P.A.

(57) ABSTRACT

A method for enhancing a presentation of a network document by a client terminal with real time social media content. The method comprises analyzing a content in a web document to identify a relation to a first of a plurality of multi participant events documented in an event dataset, each of the plurality of multi participant events is held in a geographical venue which hosts an audience of a plurality of participants, matching a plurality of event indicating tags of each of a plurality of user uploaded media content files with at least one feature of the first multi participant event to identify a group of user uploaded media content files selected from the plurality of user uploaded media content files, and forwarding at least some members of the group to a simultaneous presentation on a browser running on a client terminal and presenting the web document.

18 Claims, 8 Drawing Sheets

(51) Int. Cl.
  *G06F 16/28* (2019.01)
  *G06F 16/951* (2019.01)
  *G06F 16/958* (2019.01)
  *G06Q 50/00* (2012.01)
  *G06F 40/20* (2020.01)

(52) U.S. Cl.
  CPC ............ *G06F 16/958* (2019.01); *G06F 40/20* (2020.01); *G06Q 50/01* (2013.01); *H04L 67/02* (2013.01)

(58) Field of Classification Search
  USPC ....................................................... 707/709
  See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,117,225 | B1 | 2/2012 | Zilka |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,455 | B2 | 1/2013 | Tareen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,468,083 | B1 | 6/2013 | Szulczewski |

(56) References Cited

U.S. PATENT DOCUMENTS

| | | |
|---|---|---|
| 8,471,914 B2 | 6/2013 | Sakiyama et al. |
| 8,472,935 B1 | 6/2013 | Fujisaki |
| 8,484,015 B1 | 7/2013 | Wolfram et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Roote et al. |
| 8,909,725 B1 | 12/2014 | Sehn |
| 8,972,357 B2 | 3/2015 | Shim et al. |
| 8,972,420 B1 | 3/2015 | Story, Jr. et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0092668 A1 | 8/2007 | Harris et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214131 A1 | 9/2007 | Cucerzan et al. |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |

(56) References Cited

U.S. PATENT DOCUMENTS

| | | |
|---|---|---|
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0235209 A1 | 9/2008 | Rathod |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030899 A1* | 1/2009 | Tareen ............... G06F 17/30722 |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0064247 A1* | 3/2009 | Biniak .................. H04N 7/163 |
| | | 725/105 |
| 2009/0070346 A1 | 3/2009 | Savona et al. |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0083105 A1* | 4/2010 | Channabasavaiah ........................ |
| | | G06F 16/9537 |
| | | 715/273 |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0312769 A1 | 12/2010 | Bailey et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |

(56) References Cited

U.S. PATENT DOCUMENTS

| | | |
|---|---|---|
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0213404 A1* | 8/2012 | Steiner .............. G06F 17/30256 382/103 |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290605 A1 | 11/2012 | Ickman et al. |
| 2012/0290637 A1 | 11/2012 | Perantatos et al. |
| 2012/0290968 A1* | 11/2012 | Cecora ................ G06Q 10/107 715/780 |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0008238 A1 | 1/2013 | Hogeg et al. |
| 2013/0024757 A1 | 1/2013 | Doll et al. |
| 2013/0036364 A1 | 2/2013 | Johnson |
| 2013/0041750 A1* | 2/2013 | Ye .......................... G06Q 30/02 705/14.52 |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1* | 10/2013 | Gauglitz ................ G06Q 30/06 709/204 |
| 2013/0290443 A1 | 10/2013 | Collins et al. |
| 2013/0297380 A1 | 11/2013 | Godsey |
| 2013/0304646 A1 | 11/2013 | De Geer |
| 2013/0311255 A1 | 11/2013 | Cummins et al. |
| 2013/0325964 A1 | 12/2013 | Berberat |
| 2013/0339357 A1 | 12/2013 | Eldawy et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0013203 A1* | 1/2014 | Rogoveanu ............ G06F 17/24 715/234 |
| 2014/0019264 A1 | 1/2014 | Wachman et al. |
| 2014/0032682 A1 | 1/2014 | Prado et al. |
| 2014/0040282 A1* | 2/2014 | Mann ................... B64G 1/1021 707/748 |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122483 A1 | 5/2014 | Zhang et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0132702 A1 | 5/2014 | Leibovich et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0250126 A1 | 9/2014 | Baldwin et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0324928 A1* | 10/2014 | Tinker .............. G06F 17/30203 707/827 |
| 2014/0325383 A1 | 10/2014 | Brown et al. |
| 2015/0019203 A1* | 1/2015 | Smith .................. H04N 21/4126 704/9 |

(56) References Cited

U.S. PATENT DOCUMENTS

| | | |
|---|---|---|
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0227517 A1* | 8/2015 | Lymberopoulos .... G06F 16/172 707/706 |
| 2015/0261917 A1 | 9/2015 | Smith |
| 2015/0312184 A1 | 10/2015 | Langholz et al. |
| 2015/0319509 A1* | 11/2015 | Huang ............... H04N 21/4722 725/53 |
| 2015/0350136 A1 | 12/2015 | Flynn, III et al. |
| 2015/0356101 A1 | 12/2015 | Cohen et al. |
| 2015/0356102 A1 | 12/2015 | Cohen et al. |
| 2015/0356191 A1 | 12/2015 | Rotem et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | | |
|---|---|---|---|
| EP | 2151797 | A1 | 2/2010 |
| GB | 2399928 | A | 9/2004 |
| IL | 239237 | A | 4/2019 |
| KR | 19990073076 | A | 10/1999 |
| KR | 20010078417 | A | 8/2001 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2006118755 | A2 | 11/2006 |
| WO | WO-2009043020 | A2 | 4/2009 |
| WO | WO 2010/144915 | | 12/2010 |
| WO | WO-2011040821 | A1 | 4/2011 |
| WO | WO-2011119407 | A1 | 9/2011 |
| WO | WO-2013008238 | | 1/2013 |
| WO | WO 2013/024397 | | 2/2013 |
| WO | WO-2013045753 | A1 | 4/2013 |
| WO | WO-2014068573 | A1 | 5/2014 |
| WO | WO-2014115136 | A1 | 7/2014 |
| WO | WO-2014194262 | A2 | 12/2014 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016149594 | A1 | 9/2016 |
| WO | WO-2016179166 | A1 | 11/2016 |

OTHER PUBLICATIONS

Communication Pursuant to Rule 69 EPC—Reminder Concerning Payment of the Designation Fee (Art.79(2) EPC) and of the Examination Fee (Art.94(1) EPC)—and Invitation Pursuant to Rule 70a(1) EPC dated Dec. 14, 2015 From the European Patent Office Re. Application No. 15170648.8.

"Israel Application Serial No. 239237, Office Action dated May 23, 2017", w/ English Translation, 4 pgs.

"Israelian Application Serial No. 239238, Office Action dated Jun. 8, 2015", w. English Translation, 3 pgs.

European Search Report and the European Search Opinion dated Aug. 6, 2015 From the European Patent Office Re. Application No. 15170648.8.

Notification of European Publication Number and Information on the Application of Article 67(3) EPC dated Nov. 11, 2015 From the European Patent Office Re. Application No. 15170648.8.

Official Action dated Nov. 6, 2015 From the US Patent and Trademark Office Re. U.S. Appl. No. 14/809,219.

Official Action dated Nov. 20, 2015 From the US Patent and Trademark Office Re. U.S. Appl. No. 14/805,497.

"Israel Application Serial No. 239238, Office Action dated Oct. 15, 2017", W/English Translation, 4 pgs.

"A Whole New Story", URL: https://www.snap.com/en-US/news/, (2017), 13 pgs.

"Adding a watermark to your photos", eBay, URL: http://pages.ebay.com/help/sell/pictures.html, (accessed May 24, 2017), 4 pgs.

"U.S. Appl. No. 14/730,358, Non Final Office Action dated Mar. 2, 2018", 32 pgs.

"BlogStomp", URL: http://stompsoftware.com/blogstomp, (accessed May 24, 2017), 12 pgs.

"Cup Magic Starbucks Holiday Red Cups come to life with AR app", URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell The Whole Story", URL: https://youtu.be/uF_gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Israel Application Serial No. 239237, Response filed Apr. 9, 2018 to Office Action dated Dec. 12, 2017", 57 pgs.

"Macy's Believe-o-Magic", URL: https://www.youtube.com/watch?v=xvzRXy3J0Z0, (Nov. 7, 2011), 102 pgs.

"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvqOzjq10w, (Feb. 6, 2012), 88 pgs.

"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011/09/08/mobli-filters, (Sep. 8, 2011), 10 pgs.

Janthong, Isaranu, "Android App Review Thailand", URL: http://www.android-free-app-review.com/2013/01/instaplace-android-google-play-store.html, (Jan. 23, 2013), 9 pgs.

MacLeod, Duncan, "Macys Believe-o-Magic App", URL: http://theinspirationroom.com/daily/2011/macys-believe-o-magic-app, (Nov. 14, 2011), 10 pgs.

MacLeod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide To The New Snapchat Filters And Big Fonts", URL: https://www.buzzfeed.com/katienotopoulos/a-guide-

(56) References Cited

OTHER PUBLICATIONS to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, A Replay Function And For Whatever Reason, Time, Temperature And Speed Overlays", URL: https://techcrunch.com/2013/12/20/snapchat-adds-filters-new-font-and-for-some-reason-time-temperature-and-speed-overlays/, (Dec. 20, 2013), 12 pgs.

Tripathi, Rohit, "Watermark Images in PHP And Save File on Server", URL: http://code.rohitink.com/2012/12/28/watermark-images-in-php-and-save-file-on-server, (Dec. 28, 2012), 4 pgs.

"U.S. Appl. No. 14/730,358, Response filed Jan. 5, 2018 to Restriction Requirement dated Nov. 15, 2017", 11 pgs.

"U.S. Appl. No. 14/730,358, Restriction Requirement dated Nov. 15, 2017", 6 pgs.

"Israel Application Serial No. 239237, Office Action dated Dec. 12, 2017", 10 pgs.

"Israel Application Serial No. 239238, Response filed Jan. 8, 2018 to Office Action dated Oct. 15, 2017", 2 pgs.

U.S. Appl. No. 14/730,358, filed Jun. 4, 2015, Automatic Article Enrichment by Social Media Trends.

U.S. Appl. No. 14/809,219, filed Jul. 26, 2015, Web Document Enhancement.

U.S. Appl. No. 14/805,497, filed Jul. 22, 2015, Automatic Article Enrichment by Social Media Trends.

"U.S. Appl. No. 14/730,358, Response filed Nov. 27, 2018 to Final Office Action dated Aug. 27, 2018", 18 pgs.

"U.S. Appl. No. 14/730,358, Final Office Action dated Aug. 27, 2018", 32 pgs.

"U.S. Appl. No. 14/730,358, Final Office Action dated Jul. 9, 2019", 25 pgs.

"U.S. Appl. No. 14/730,358, Response filed Aug. 29, 2019 to Final Office Action dated Jul. 9, 2019", 14 pgs.

"U.S. Appl. No. 14/730,358, Advisory Action dated Sep. 12, 2019", 3 pgs.

"Israel Application Serial No. 239238, Office Action dated Sep. 26, 2019", w/ English Translation, 8 pgs.

"U.S. Appl. No. 14/730,358, Response filed May 15, 2019 to Non Final Office Action dated Feb. 15, 2019", 18 pgs.

"U.S. Appl. No. 14/730,358, Non Final Office Action dated Feb. 15, 2019", 27 pgs.

"U.S. Appl. No. 14/730,358, Non Final Office Action dated Nov. 21, 2019", 22 pgs.

"U.S. Appl. No. 14/730,358, Response filed Feb. 21, 2020 to Non Final Office Action dated Nov. 21, 2019", 14 pgs.

"Israel Application Serial No. 239238, Response filed Jan. 16, 2020 to Office Action dated Sep. 26, 2019", w/ English Claims, 41 pgs.

"U.S. Appl. No. 14/730,358, Advisory Action dated Jun. 30, 2020", 3 pgs.

"U.S. Appl. No. 14/730,358, Examiner Interview Summary dated Jun. 19, 2020", 4 pgs.

"U.S. Appl. No. 14/730,358, Final Office Action dated Apr. 20, 2020", 24 pgs.

"U.S. Appl. No. 14/730,358, Response filed Jun. 22, 2020 to Final Office Action dated Apr. 20, 2020", 13 pgs.

"U.S. Appl. No. 14/730,358, Final Office Action dated Dec. 15, 2020", 29 pgs.

"U.S. Appl. No. 14/730,358, Non Final Office Action dated Aug. 27, 2020", 29 pgs.

"U.S. Appl. No. 14/730,358, Response filed Nov. 25, 2020 to Non Final Office Action dated Aug. 27, 2020", 15 pgs.

"Israel Application Serial No. 239238, Office Action dated Nov. 10, 2020", w/ English Translation, 13 pgs.

"Israel Application Serial No. 263074, Office Action dated Oct. 19, 2020", w/ English Translation, 6 pgs.

"U.S. Appl. No. 14/730,358, Advisory Action dated Feb. 26, 2021", 3 pgs.

"U.S. Appl. No. 14/730,358, Examiner Interview Summary dated Feb. 17, 2021", 3 pgs.

"U.S. Appl. No. 14/730,358, Non Final Office Action dated Apr. 2, 2021", 30 pgs.

"U.S. Appl. No. 14/730,358, Response filed Feb. 16, 2021 to Final Office Action dated Dec. 15, 2020", 13 pgs.

"Israel Application Serial No. 239238, Response filed Mar. 4, 2021 to Office Action dated Nov. 10, 2020", 19 pgs.

"Israel Application Serial No. 263074, Response filed Feb. 10, 2021 to Office Action dated Oct. 19, 2020", 47 pgs.

"U.S. Appl. No. 14/730,358, Response filed Jul. 1, 2021 to Non Final Office Action dated Apr. 2, 2021", 14 pgs.

"U.S. Appl. No. 14/730,358, Final Office Action dated Aug. 17, 2021", 31 pgs.

"U.S. Appl. No. 14/730,358, Advisory Action dated Oct. 29, 2021", 4 pgs.

"U.S. Appl. No. 14/730,358, Non Final Office Action dated Nov. 29, 2021", 34 pgs.

"U.S. Appl. No. 14/730,358, Response filed Oct. 18, 2021 to Final Office Action dated Aug. 17, 2021", 14 pgs.

"U.S. Appl. No. 14/730,358, Response filed Nov. 17, 2021 to Advisory Action dated Oct. 29, 2021", 16 pgs.

"Israel Application Serial No. 283319, Office Action dated Dec. 7, 2021", w/ English translation, 7 pgs.

\* cited by examiner

WEB DOCUMENT ENHANCEMENT

RELATED APPLICATIONS

This application claims the benefit of priority under 35 USC 119(e) of U.S. Provisional Patent Application Nos. 62/007,974 filed on Jun. 5, 2014 and 62/138,551 filed on Mar. 26, 2015, the contents of which are incorporated herein by reference in their entirety.

BACKGROUND

The present invention, in some embodiments thereof, relates to web document enhancement and, more specifically, but not exclusively, to web document enhancement using user loaded media content files.

Advances in digital multimedia creation and editing technologies have made available to a wider group of people the tools to capture, tag (e.g. manually or automatically), and edit their own media content, for example image, video, audio, and graphic creations on their client devices. Many capturing, tagging and editing tools are available on the market that allows a non-professional user who is participating in a certain event to create and upload media content item during the event in real time. The media content may even be edited in no time using preset filters and image processing functions.

The growing interest in creating and editing personalized content, such as video, audio, and graphic creations, has increased the amount of user uploaded content which is available for usage.

SUMMARY

According to some embodiments of the present invention, there is provided a method for enhancing a presentation of a network document by a client terminal with real time social media content. The method comprises analyzing a content in a web document to identify a relation to a first of a plurality of multi participant events documented in an event dataset, each of the plurality of multi participant events is held in a geographical venue which hosts an audience of a plurality of participants, matching a plurality of event indicating tags of each of a plurality of user uploaded media content files with at least one feature of the first multi participant event to identify a group of user uploaded media content files selected from the plurality of user uploaded media content files, and forwarding at least some members of the group to a simultaneous presentation on a browser running on a client terminal and presenting the web document.

Optionally, the plurality of event indicating tags comprises a set of tags representing a capturing location and a capturing time and the at least one feature of the first multi participant event comprises an event time value, and an area defining value.

Optionally, the method comprises receiving from the client terminal a request for the at least some members, the request being issued by a client module which monitors the browser in response to a user input detected on the client terminal.

Optionally, the plurality of user uploaded media content files comprise a plurality of video files and a plurality of images both captured by a plurality of different users and uploaded from a plurality of different client terminals.

Optionally, the event dataset is created by an analysis of content from a plurality of web documents.

Optionally, the event dataset is created by an analysis of information about the location and time of at least some of the plurality of user uploaded media content files.

Optionally, the simultaneous presentation is implemented as an overlay which is presented on top of a part of the web document.

Optionally, the first multi participant event is defined by a first value setting plurality of different locations and a second value defining a common timing.

Optionally, the event dataset is created by an analysis of a plurality of search queries filed by a plurality of users.

Optionally, the web document is a webpage.

Optionally, the plurality of user uploaded media content files is clustered to a plurality of clusters according to an analysis of the plurality of event indicating tags of each of the plurality of user uploaded media content files; wherein the group is selected from the plurality of clusters.

Optionally, the analyzing of the content comprises a natural language processing (NLP).

Optionally, the analyzing is induced by a loading of the web document by the browser and comprises analyzing a plurality of search keywords of a search query submitted prior to the loading.

Optionally, the method comprises iteratively updating of the event dataset with up-to-date multi participant events.

Optionally, the method comprises iteratively updating of a dataset documenting the plurality of user uploaded media content files with new user uploaded media content files and repeating the matching with the new user uploaded media content files instead of at least some of the plurality of user uploaded media content files for updating the group and forwarding at least some members of the updated group to the simultaneous presentation.

According to some embodiments of the present invention, there is provided a network node set to be connected to a plurality of client via a network for enhancing a presentation of a network document with real time social media content, comprising: a database which hosts an event dataset documenting a plurality of multi participant events each held in a geographical venue which hosts an audience of a plurality of participants, at least one processor, a web document analyzer which uses the at least one processor to analyze content in a plurality of web documents to identify, per the web document, a relation to a first of the plurality of multi participant events, a selection module which matches, per the web document, a plurality of event indicating tags of each of a plurality of user uploaded media content files with at least one feature of the first multi participant event to identify a group of user uploaded media content files selected from the plurality of user uploaded media content files, and client interface module which receive a request from a client terminal hosting a browser displaying a respective the web document and forwards, in response to the request, at least some members of the group for a simultaneous presentation with the web document by the browser.

According to some embodiments of the present invention, there is provided a method for detecting an on-going event by an analysis of social media content. The method comprises monitoring an uploading of a plurality of user uploaded media content files by a plurality of client terminals, each of the plurality of user uploaded media content files is tagged with a time indication and a location indication and comprises at least one of an image or a video captured by at least one of the plurality of client terminals, clustering the plurality of user uploaded media content files based on respective the location indication and respective the time indication to create a plurality of location and time dependent media content files clusters, identifying an ongoing event held in a geographical location which hosts a plurality of participants and documented in a certain of the plurality of location and time dependent media content files clusters according to an analysis of at least one of (1) respective the location indication and respective the time and (2) an image processing members of the certain location and time dependent media content files cluster, and generating an indication of the on-going event.

Optionally, wherein the identifying an on-going event held comprises matching between content loaded in at least one text content feed and data of the certain location and time dependent media content files cluster.

Optionally, the method further comprises text tagging the certain location and time dependent media content files cluster according to the matching.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
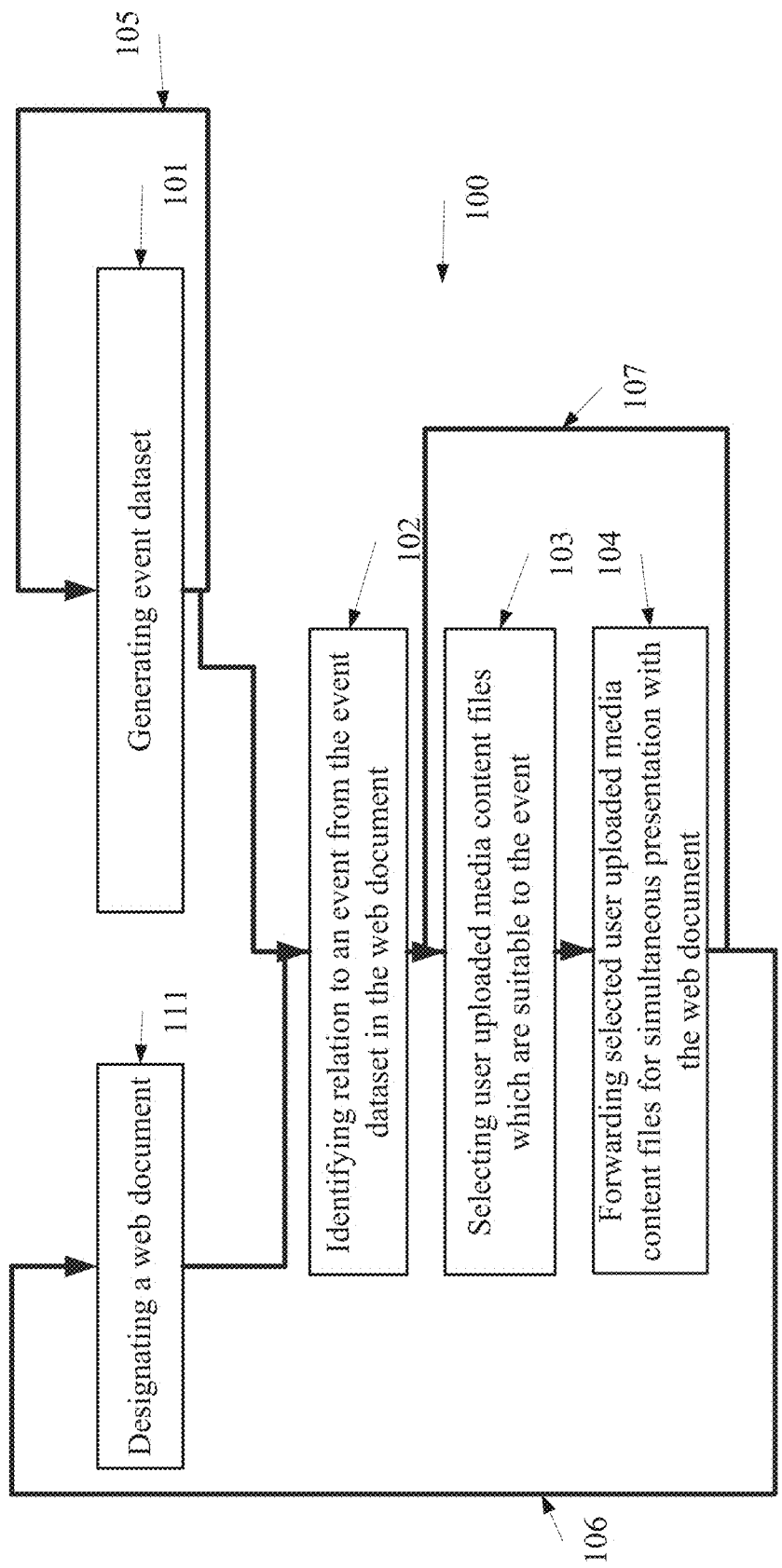
FIG. 1 is a flowchart of a method for enhancing a client terminal presentation of a web document related to a multi participant event with real time social media content based on an analysis of the content in the web document and data capturing information regarding the social media content, according to some embodiments of the present invention.

The present invention, in some embodiments thereof, relates to web document enhancement and, more specifically, but not exclusively, to web document enhancement using user loaded media content files.

According to some embodiments of the present invention, there are provided methods and systems for enhancing web documents with user uploaded media content items, such as images, video, and user inputs such as twits, based on a match between a multi participant event referred to in the web documents and characterizing features of the user uploaded media content items. The methods and systems are optionally supported by a client module running on a browser of a client terminal, for example an extension, a web service, or an integrated function of a browser. The client module identifies a user request for web document enhancement or a loading of a webpage which is browsed to by the browsing user and communicated via a network with a central system (e.g. servers) which matches user uploaded media content items for the web document that is currently displayed by the browser that hosts the client module. The user uploaded media content items are optionally associated with a link to allow the browsing user to receive more information about a selected uploaded media content item, to present it with a different player and/or resolution and/or to access related data sources.

Optionally, the systems and methods involve continuous and/or iterative updating of a dataset of multi participant events to assure that reference to up-to-date multi participant events in designated web documents is identified for enhancement of the designated web documents. Additionally or alternatively, the system and method involve continuous and/or iterative associating between up to date user loaded media content files and records of a dataset of multi participant events to assure web documents are enhanced with the most recent user loaded media content files.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart 100 of a method for enhancing a client terminal presentation of a web document related to a multi participant event with social media content based on an analysis of the content in the web document and characteristics of the social media content, according to some embodiments of the present invention.

As used herein, a web document may be any document which has a Uniform Resource Identifier and is accessible via a network, for example a webpage, a video file, an image file, a text document and/or any other document which is accessible via a browser.

The social media content or user uploaded media content file may include images and/or video files uploaded by members of a social network, statuses and/or posts uploaded by members of a social network, for example text files, metadata related to images and/or video files and/or statues such as comments and likes data and/or the like. The social media content may be referred to one or more files and/or any other user uploaded content. The social media content includes or associated with data capturing features, referred to herein as features, such as tags and/or metadata indicative of capturing location, capturing time, capturing photographer characteristics and/or any other data or metadata indicative of the content depicted thereby. For example, the data capturing feature of a video file or an image include a capturing location, a capturing time, and a photographer identifier (ID). The photographer ID may be used to identify any photographer characteristic, for example demographic data about the photographer (i.e. gender, age, socioeconomic data and/or the like) and/or about the device used by the photographer (i.e. type of a client terminal, application(s) installed on the client terminal and/or the like) and/or about the social media to which the photographer uploaded the content.

As used herein, a multi participant event is an event held in a certain time and non virtual venue, for example a concert, a show, a conference, a meeting, a demonstration, a news event, a festival, and/or the like. For brevity, a multi participant event may be referred to herein as an event. The multi participant event may scheduled in advance or occurring as an outcome of circumstances, for instance a terror attack and/or a gathering of people induced by a presence of a celebrity, an artist and/or the like.

The method is set to allow enhancing web documents related to a multi participant event(s) and presented at a client terminal to a user with content from social media files uploaded by participants of the multi participant event(s) and/or other users who documented the multi participant event(s) and/or the surroundings of the event. Optionally, the enhancement is facilitated using a client module installed or loaded by a browser installed in the client terminal which displays the web document.

In use, a user who accesses a web document, such as a webpage displaying an article, an image, or a video (e.g. file or stream) about a held or a currently held multi participant event(s) is presented with a graphical user interface (GUI) that allows him to request for content enhancement and/or with an indication that such a content is available for him Upon accessing a web document and/or selecting for content enhancement, for example by pressing a button (e.g. click of a mouse over an icon) or by a touch event, a request is sent to a web document enhancing system, for example as described below. The web document enhancing system identifies the multi participant event described in the web document, for example by an analysis of the content and/or metadata thereof and matches user uploaded media content files which are related to the multi participant event accordingly. The matched user uploaded media content files are streamed, forwarded, and/or otherwise rendered together with the display of at least part of the web document (for brevity at least part of the web document and the web document as a whole are referred to interchangeably), enhancing the user experience by providing her with real time user uploaded images and videos taken during the multi participant event and/or several seconds or minutes after or before the multi participant event. The uploaded content may be viewed during or after the multi participant event.

Figure 2:
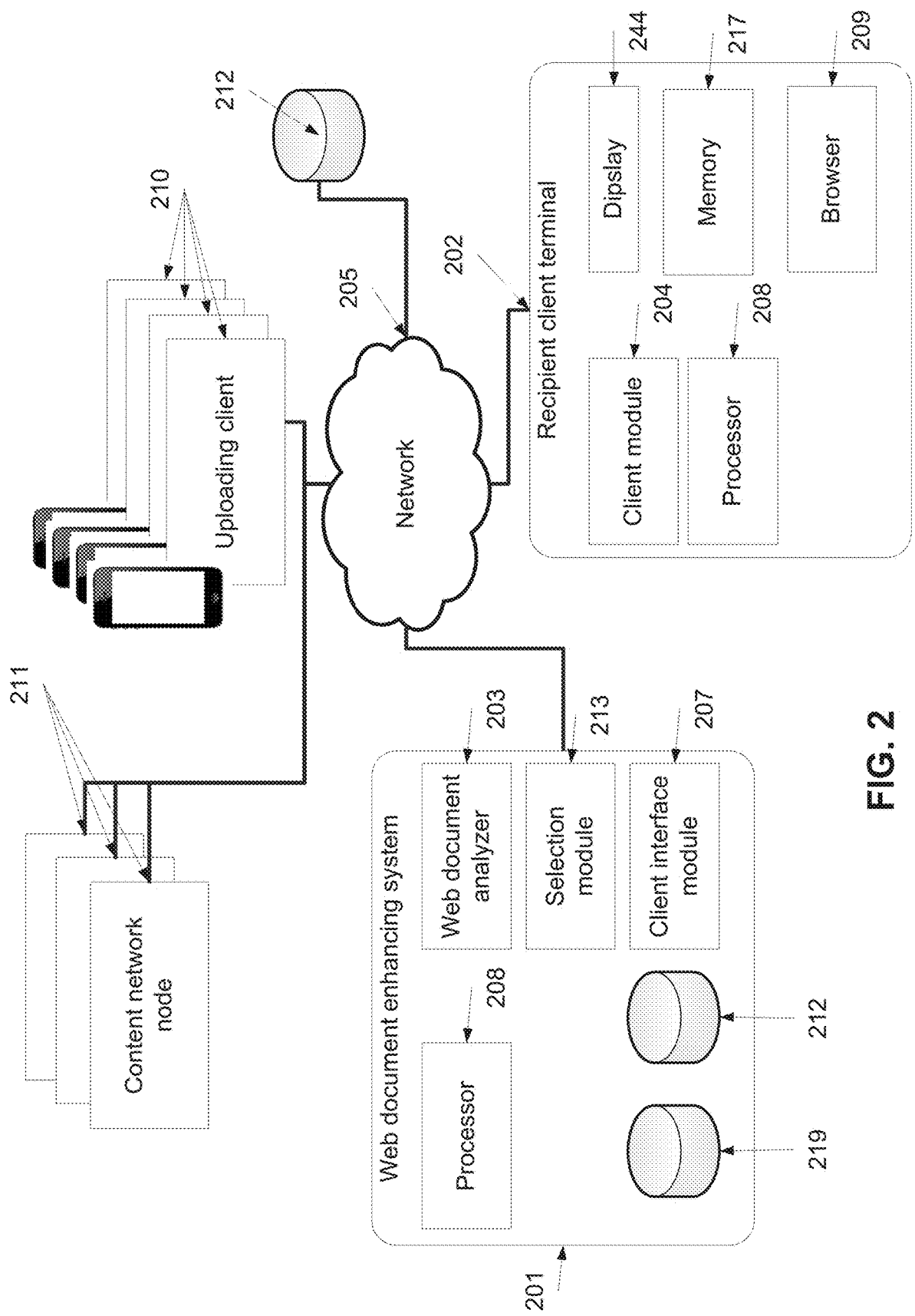
FIG. 2 is a schematic illustration of an exemplary recipient client terminal, a web document enhancing system for enhancing the presentation of web documents by the recipient client terminal, and one or more client terminals, all connected to a network, such as the internet, according to some embodiments of the present invention.

Reference is also made to FIG. 2, which is a schematic illustration of an exemplary recipient client terminal 202, a web document enhancing system 201 for enhancing the presentation of web documents by the recipient client terminal 202, and one or more client terminals 210 which upload media content files, all connected to a network 205, such as the internet, according to some embodiments of the present invention. The web document enhancing system 201 includes or connected to a database 219 which hosts an event dataset (e.g. one or more lists, matrixes, indexes, tables and/or the like) documenting a plurality of multi participant events held in a geographical venue which hosts an audience of a plurality of participants.

The web document enhancing system 201 further includes one or more processors 208 and a web document analyzer 203 which uses the processor(s) 208 to identify which multi participant event are referred to, for example, in analyzed web documents hosted by third party content network nodes 211, for instance by textual or contextual analysis of the content therein, in selected feeds, and/or in user uploaded content, for example as described below. As used herein, a network node means a server, a database, a virtual machine and/or any other network accessible computing unit such as one or more servers.

The web document enhancing system 201 further includes a selection module 213 which selects a group of user uploaded media content files from a user generated media files repository 212 based on the multi participant event identified are referred to by the web document(s) by the web document analyzer 203.

The web document enhancing system 201 further includes a client interface module 207 which receives a media data request from the recipient client terminal 202 and, in response to the request, responds with the matching user uploaded media content files from a selected group. The response may include a list of references to user uploaded media content files, instructions for rendering user uploaded media content files, a stream of social media contents, user uploaded media content files, list of references to other webpages identified as related to the event and/or any combination thereof. The user uploaded media content files may be ordered as described below.

The recipient client terminal 202 is optionally a client end device, such as a Smartphone, a laptop, a desktop, a tablet, and/or a wearable device which runs or hosts a browser set to display web documents. The recipient client terminal 202 optionally includes a display 244, a processor 208, a memory 217, and a browser 209 (e.g. Google Chrome™, Internet Explorer™ and/or an application with integral browsing module). The recipient client terminal 202 optionally hosts a client module 204 which communicates with the Web document enhancing system 201 for requesting and receiving media content files which are related to a web document which is currently displayed by the browser 209. The client module 204 is set to display the received media content files, either as an overlay or in a designated web client, for example as described below. The client module 204 may be implemented as an add-on to the browser 209, for example as a browser extension, a web application which is loaded with a web document, for instance as an AJAX component or a Javascript and/or the like.

As shown at 101, an event dataset documenting a plurality of multi participant events, each held in a geographical venue which hosts an audience of a plurality of participants, for example as defined above, is provided. The event dataset is optionally created by an event list creator module (not shown) which maps planned, user defined, and/or trend based selected events. For example, each record of the event dataset is indicative of an event and includes a feature set which includes a title field, such as a Field (League) or performer of a concert, location field, for example coordinates, time, related events field, for instance concert of the same performer, and/or sub events field, for example an after party or a press release event.

The events may be identified by crawling web documents, such as electronic program guides (EPG), schedules of concert halls, articles, selected websites, and/or the like. The events may be manually added by users, for example using a designated application function or a portal and/or by an operator. The event dataset, for instance a list, is stored in the event database (DB) 219. Optionally, events are created in real time by a real time (RT) event creator module, for instance based on an analysis such as a natural language processing (NLP) analysis of news feeds, user uploads and/or the like.

Optionally, locations are automatically added to an event based on the relevancy thereof to the event. For example, when the event is Black Friday, locations which are associated with retailers may be automatically identified and added.

Figure 3:
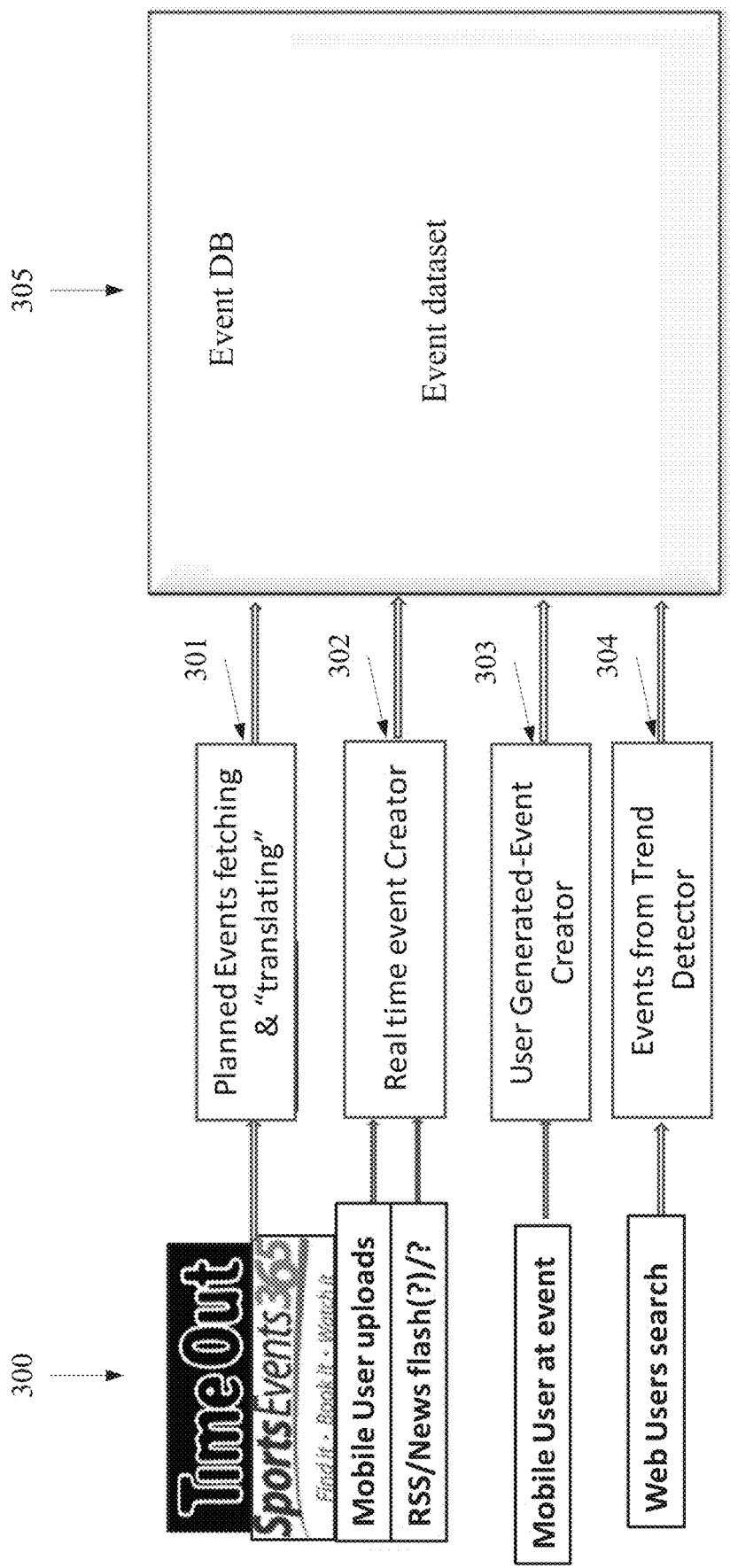
FIG. 3 is a schematic illustration of sources which load data to sub modules for automatically adding multi participant events to an event dataset, according to some embodiments of the present invention.

FIG. 3 is a schematic illustration of sources 300 which load data to sub modules 301-304 of an event creator module for automatically adding events to the event dataset, for example stored as shown in 305, according to some embodiments of the present invention. Fetching sub module 301 may process data from designated web documents, for instance identified by URLs, to identify new events. RT event creator sub module 302 may process the text in a feed such as Cable News Network (CNN) Rich Site Summary (RSS) and/or similar RSS in real time to identify location (e.g. addresses) of currently held event. A user generated event creator sub module 303 analyzes features (e.g. tags) and capturing location from capturing information of uploaded media content files received from any of a plurality of client modules, for instance metadata of an image uploaded by uploading clients 210 to the system 201 or to a social media network to which the user is connected, such as Mobli™ Facebook™, and/or Instagram™. In another example, the RT event creator module receives user inputs from a plurality of client modules, for instance when a user reports an event to the system 201. In another example, a RT trend detector sub module 304 analyzes trends in user searches to detect event trends, for instance mostly searched events. The detected trends are marked as events which are added to the event dataset. As shown at 105, the event dataset may be continuously updated when updated information is received from one of the above sources.

According to some embodiments of the present invention, on-going event(s) are identified by an analysis of social media content files which is uploaded by different users who use different client terminals, for instance as described above. In use, uploading of a plurality of user uploaded media content files by a plurality of client terminals is monitored for example by a module which crawls the records of the user generated media files repository 212. Each of the plurality of user uploaded media content files is tagged with a time indication and a location indication and may comprise image(s) and/or video file(s) captured by one or more of the client terminals 210. This allows the monitoring module or a module which communicate therewith to cluster some or all of the user uploaded media content files based on the location indications and/or time indications to create a plurality of location and time dependent media content files clusters. Each cluster may include images or video of the same event. Now, monitoring module or another module may identify one or more on-going events held in geographical location(s) which hosts a plurality of participants and documented in one or more of the location and time dependent media content files clusters. The clustering may be performed according to an analysis of the location indications and/or the time tags of the location and time dependent media content files and/or based on image processing of the media content files.

Figure 4:
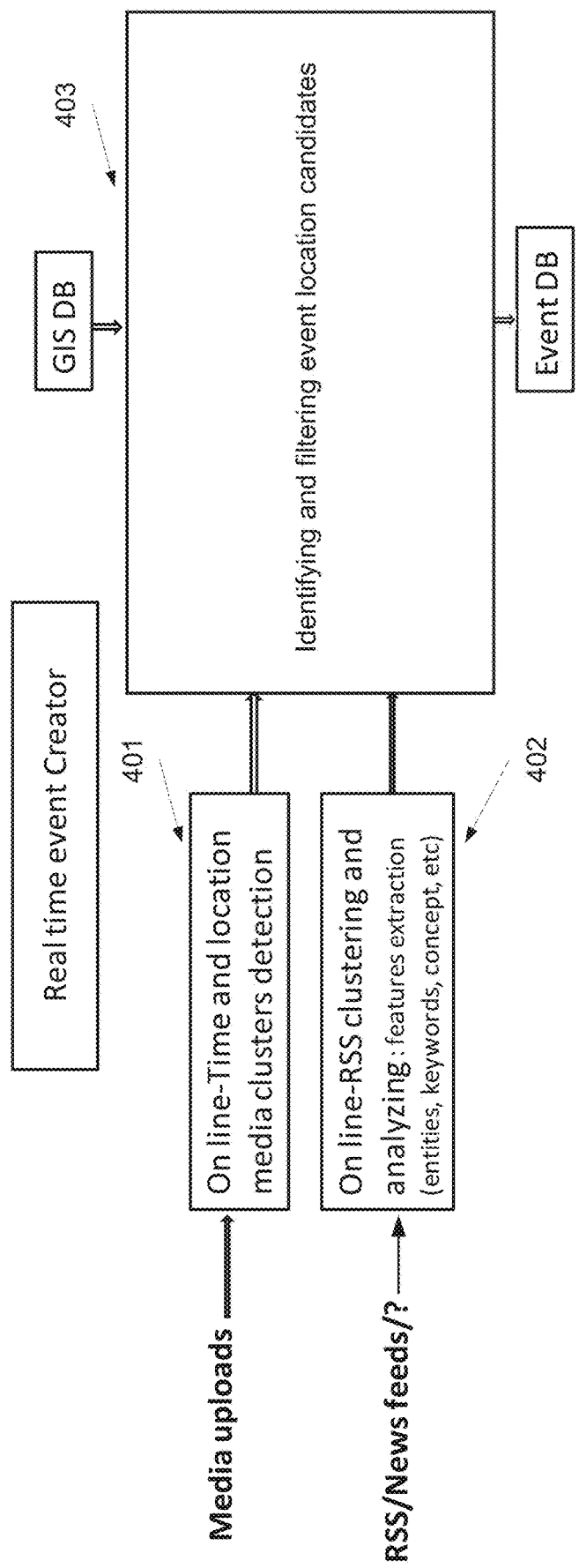
FIG. 4 is a schematic illustration of a process of updating an event dataset based on a combination of media content files upload and data excavated from feeds, such as RSS and News feeds, according to some embodiments of the present invention.

Optionally, each one of the image clusters is validated and/or text tagged based on real time data that is acquired from feeds, such as news resources such as RSS, tweets. For example, FIG. 4 depicts the process of updating an event dataset based on a combination of media content files upload 401 and data excavated from feeds, such as RSS and News feeds 402. Each record of the event dataset includes a set of features such as media (e.g. origin social media or origin web document), time, location and additional descriptive fields from third party sources, such as RSS. As shown at 403, received data is analyzed using Geographic Information System (GIS) data for identifying and filtering event location candidates. This is optionally done by identifying a location a textual analysis of the received feeds and the event indicative tags of clusters of the uploaded media content files 401 and using data from the GIS data to extract coordinates of the location and/or any other unified address representation of the location. The GIS data or the unified address are set to define a potential event location and optionally matched with GIS DB candidate event locations. Optionally, each event is associated with a specified radius (e.g. street names, facilities, coordinates etc.) so as to allow matching user inputs, images and video clips taken in that radius during the event or shortly before and/or after.

Optionally, a candidate location from one source is validated by a comparison with candidate location(s) from other sources. For example, a candidate location derived from a cluster of user uploaded media files is compared with a candidate location derived from a feed, such as an RSS.

As shown at 111 and 102, a web document is designated and analyzed to identify a relation to a one or more of the multi participant events in the event dataset.

The web document may be analyzed by the web document analyzer 203. For example, web document is designated for analysis when the web document is selected and/or accessed by a viewing user. Additionally or alternatively, web document is designated for analysis in a preprocessing stage, together with other web documents, for example by a crawler mechanism that documents to which of the multi participant events web documents are related and/or. The analysis may be induced when an access to a webpage is detected and/or when a button or any other user input is indicated by the user when he or she uses a GUI presented with by the client module 204.

The analysis may be induced when a user submits a search query to a search engine, either using a GUI of the client module 204 and/or a search engine accessed via the browser. In such embodiments, the search key words of a search query submitted prior to the loading of the browsed web document are analyzed, optionally even before the user accesses to web document.

The web documents which appear in the results to the search query may be automatically analyzed. The search query and/or the web documents which appear in the results to the search query may be gathered for analysis by the client module 204.

Figure 5:
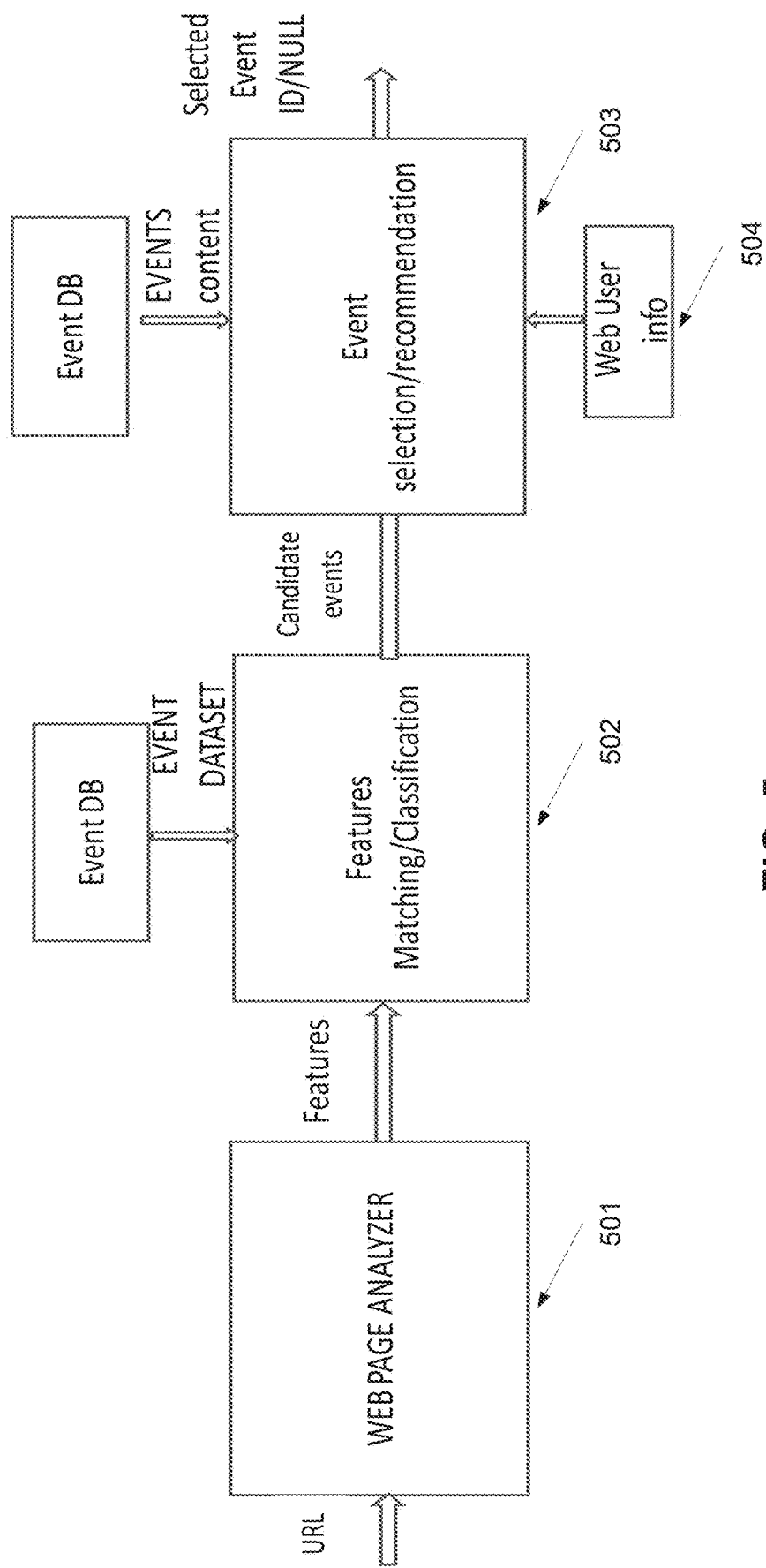
FIG. 5 is a schematic illustration of a process for identifying which multi participant event is related to a designated web document, according to some embodiments of the present invention.

For example, FIG. 5 describes a process for identifying which multi participant event is related to a designated web document, according to some embodiments of the present invention. First, as shown at 501, a web document, identified by a URL, is analyzed to extract features such as entities, keywords, and/or any indicator of what is happening, when (time), and where (location). The analysis may be performed based on known NLP algorithms and/or Application Program Interfaces (APIs), such as AlchemyAPI. The analysis optionally generates a set of features for matching with the records of the event dataset.

Then, as shown at 502, candidate events are selected by matching the extracted features, for classification or ranking, with features of events from the event dataset from the event DB. Optionally, a machine learning process is applied to classify the set of features of each event in the event dataset. This is used in the above matching process.

As shown at 503, one of the candidate events is selected by a designated module. Optionally, the selection is made using information retrieval methods for ranking relevancy of the set of features of each candidate event to different types of events. The outcome of such a step is a confidence level and/or a relevancy score of the designated web document, for example a Uniform Resource Locator (URL) thereof, to each of the candidate events. This allows automatic event selection and/or recommendation based on confidence level, a content quality evaluation, and/or web user personalization data. The content quality evaluation may be determined using an additional module. The web user personalization data may be gathered by a GUI executed by the client module 204, as shown at 504. The web user personalization data is optionally stored in a user record accessible to the web document enhancing system 201.

As shown at 103, a group of user uploaded media content files are selected from one or more database(s) of user generated media files for the designated web document. The selection may be based on a match between image, video, or any other user input features (e.g. tags) and the features of the event related to in the designated web document. The user generated media files are optionally tagged with a plurality of event indicating tags. Each indicating tag is indicative of one of the documented multi participant events. For example, an indicating tag is a metadata added by the image capturing user at the uploading client 210, for instance textual tags added by the user. Tags may be location and/or time tags which are added to the user generated media file, for example automatically. Tags may be automatically added or removed by an image processing module, for example an image processing module that identifies and removes portraits and/or an image processing module that identifies common expected object composition and/or expected object presence at a multi participant event images. Optionally, each user generated media file is ranked, either by users of a respective social media network in which the user generated media file is presented or by a computerized quality assessment generated by the image processing module.

It should be noted that user uploaded media content files may be clustered in advance based on a match with records of the event dataset. In such embodiments, a dataset which associates between media content files and events may be generated and continuously or iteratively updated, for instance whenever a new user uploaded media file is discovered.

According to some embodiments of the present invention, the event dataset includes a set of links which link between events. In such a manner, related events may be linked, for example concerts of the same artist from different venues and times, demonstrations of the same topic from different venues and times, concurrent related events, such as holiday related events, and/or the like. The link allows selecting images from one event for a display in a web document related to a linked event.

According to some embodiments of the present invention, the event dataset includes a set of references to websites or databases, such as related news sites, for example an artist website or related electronic forum. In such a manner, related websites or databases may be searched for media files. The links allows selecting images or videos which are related to the event for a display in the web document.

Now, as shown at 104, some or all of the members of the selected group/cluster is forwarded for a simultaneous presentation on the client terminal presenting the web document. Optionally, the members of the selected group are ordered in a list for setting a content displaying order. The order may be set according to:

an image or video quality rank, for example set as described above;

an image or video source (e.g. Mobli™, Instagram™, Twitter™ and/or the like);

a web users ranking, for example the number of likes and/or shares;

a presence or an absence of one or more filtering characteristics such as a self portrait;

a diversity indicator, for example a dynamic ranking which set according to a user generated media file to previously displayed user generated media files, for example by evaluating a similarity of an image or a video file to previously presented files;

a presence or absence of filtering characteristics, such as a presence of a facial area which is larger than a certain percentage of the image, a presence of nudity, a presence of haltered flags or icons and/or the like;

a relevancy rank which is set by processing the image to identify a match with event characteristics, for example a presence of a stage in the imaged area of a concert, a presence of a lawn in the imaged area of a football game, and/or the like;

capturing time; and a match with an event story record that defines the event class, the event time, the event location and/or the like.

For example, FIGS. 6A-6H are a set of screenshots depicting a process wherein a web document is enhanced with user uploaded content related to an event referred to in that web document, according to some embodiments of the present invention. In this example, the client module 204 is implemented as a browser extension which is set to be activated when a user clicks or touches an icon added to the search bar of the browser, for example as shown at 601 of FIG. 6A.

Figure 6A:
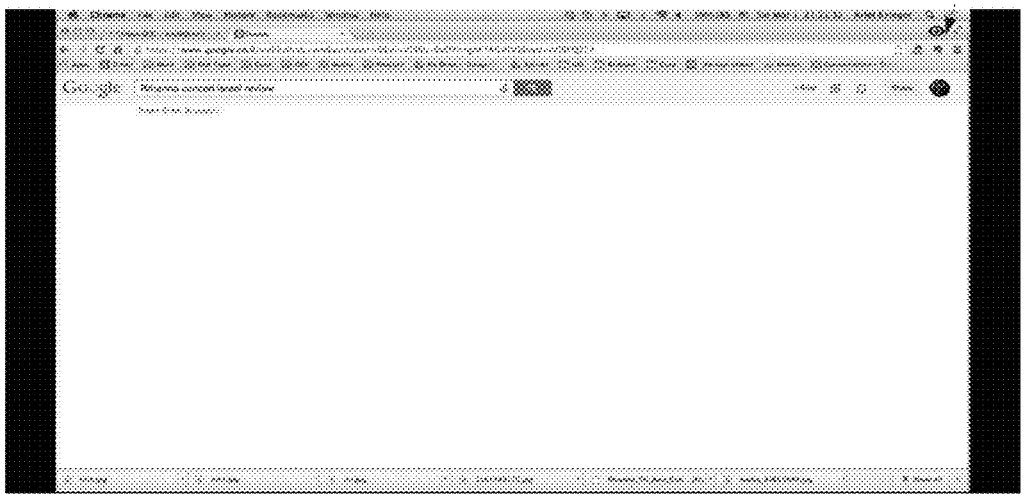
FIGS. 6A-6H are a set of screenshots depicting a process wherein a web document is enhanced with user uploaded content related to a multi participant event referred to in the web document, according to some embodiments of the present invention.
Figure 6B:
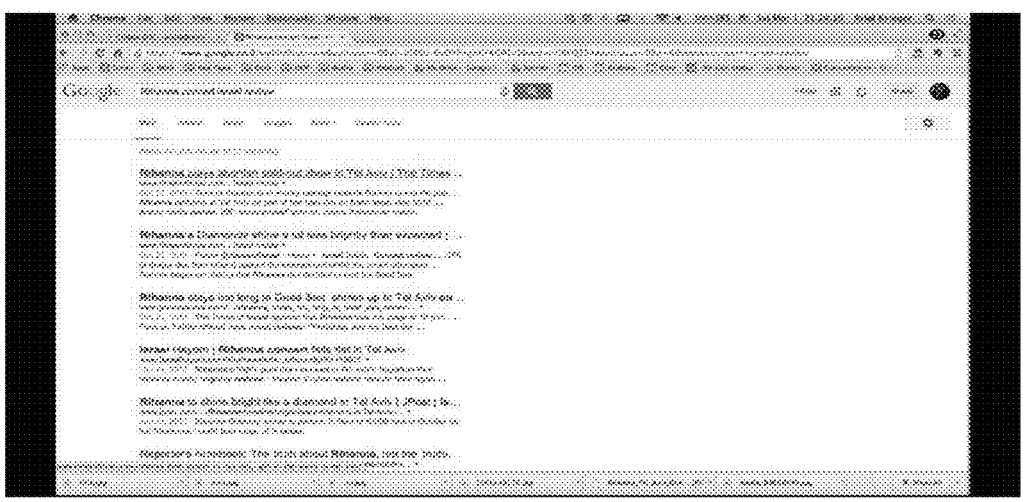

In use, the client module is set to identify to which event the browsed web document is related by an analysis of search key words in a search query submitted prior to the loading of the browsed web document, for example see the search key words in FIG. 6B.

Figure 6C:
Figure 6D:
Figure 6E:
Figure 6F:

As shown at 107, the user uploaded media content files which are selected and forwarded to be presented with the web document are continuously or iteratively updated, in real time, for example when new media content files tagged with event indicating tags which match the properties of the event related to in the designated web document are discovered. Additionally or alternatively, words and phrases in the web document itself, which are indicative of a multi participant event, are extracted and analyzed. For example, the web document shown at FIG. 6C is analyzed to detect the words marked by rectangular shapes in FIG. 6D. After the web document is associated with an event, for example Rihanna concert in Tel Aviv, Israel, a group of user uploaded media files are sent to the client module 204 for presentation on the display 244 of the client terminal 202, together with the web document. The group is optionally selected as described above. 603 of FIG. 6E depicts an exemplary presentation of the members of the group, for example images and video clips, ordered as described above. As shown at 604, the presentation may be updated over time when new user uploaded media content files are uploaded and tagged with tags which are indicative of the event related to in the designated web document.

Figure 6G:
Figure 6H:
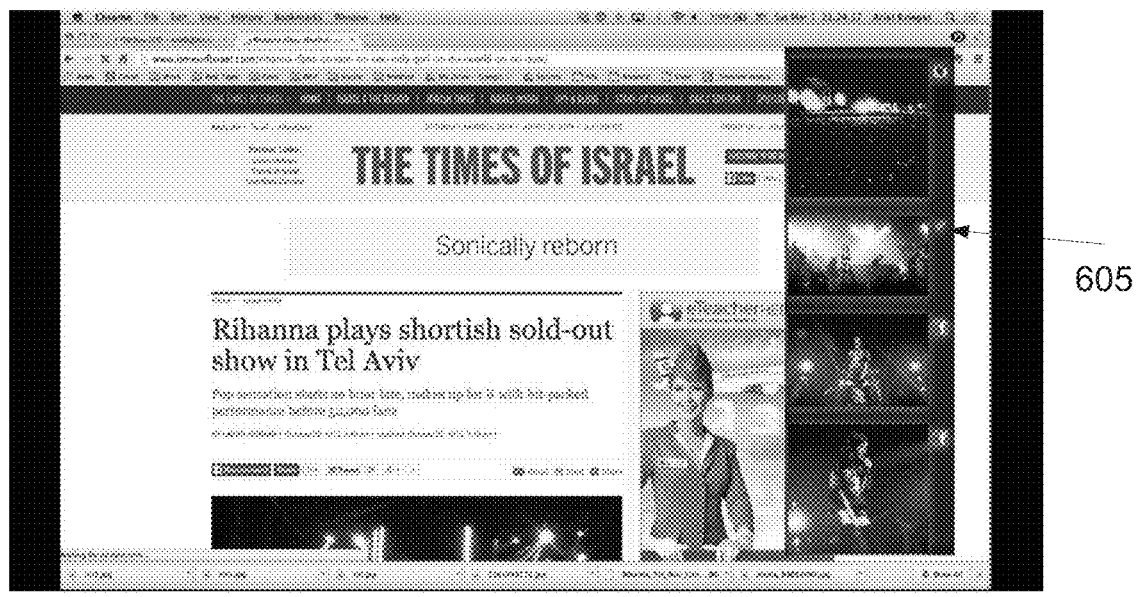

Optionally, each user uploaded media content file is presented with an icon indicative of the source thereof, for example Mobli™ database, Twitter™ database, Instagram™ database, or Facebook™ database, see for example 605 in FIG. 6G or 6H. Optionally, each user uploaded media content file is linked to a source webpage, allowing the user to browse to the source webpage, for example for viewing more images or video clips from the same uploader and/or for viewing the image in higher resolution.

Optionally, selecting the user uploaded media content file by a click or touch will induce enlargement thereof and/or instructing the browser to browse to a source webpage. Optionally, the browsing user presented with the uploaded media content file may add a feedback to any of the uploaded media content files which are presented thereto, for example set a like or add a comment. The like and/or the comment are associated with the uploading user, providing a personal feedback thereto.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a processor, and a user uploaded media file is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method, comprising:
receiving, at an enhancement network node from a browser extension of a browser running on a client terminal, a request for content enhancement of a web document being currently displayed at the client terminal via the browser, the web document being provided to the client terminal by a third-party content network node, the request comprising a universal resource locator that identifies the web document; and
in response to the request:
accessing the web document using the universal resource locator;
analyzing a content of the accessed web document to extract a set of features from the web document;
using a machine learning process to classify the set of features to generate a set of classified features;
selecting a set of candidate events by matching the set of classified features with one or more features of events described in an event dataset;
generating a ranked set of candidate events by ranking each candidate event, in the set of candidate events, based on relevancy of a set of event features of the candidate event to the web document; and
identifying an individual event from the ranked set of candidate events;
identifying a group of user uploaded media content files, in a plurality of user uploaded media content files, by matching at least one feature of the individual event with at least one event indicating tag associated with an uploaded media content file in the plurality of user uploaded media content files, the identifying of the group of user uploaded media content files comprising:
assigning individual user uploaded media content files of the plurality of user uploaded media content files to clusters according to an analysis of the at least one event indicating tag to yield a plurality of clusters, the group of user uploaded media content files being selected from the plurality of clusters;
forwarding, from the enhancement network node to the browser extension of the browser running on the client terminal, at least one media content file of the group of user uploaded media content files, the browser extension being configured to cause a simultaneous presentation of the at least one media content file on the browser with the web document, the simultaneous presentation of the at least one media content file being separate from presentation of the web document by the browser, and the simultaneous presentation being implemented as an overlay displayed over a part of the presentation of the web document;
iteratively updating a dataset documenting the plurality of user uploaded media content files with one or more new user uploaded media content files;
updating the group of user uploaded media content files by repeating the identifying of the group of user uploaded media content files with the one or more new user uploaded media content files; and
forwarding at least one media content file of the updated group to the simultaneous presentation.

2. The method of claim 1, wherein the at least one event indicating tag comprises a tag representing at least one of a capturing location or a capturing time, and wherein the at least one feature of the individual event comprises at least one of an event time value or an area defining value.

3. The method of claim 1, wherein the request is issued by the browser extension in response to detecting access of the web document on the client terminal.

4. The method of claim 1, wherein the plurality of user uploaded media content files comprises a plurality of video files and a plurality of image files both captured by a plurality of different users and uploaded from a plurality of different client terminals.

5. The method of claim 1, wherein the event dataset is created by an analysis of content from a plurality of web documents.

6. The method of claim 1, wherein the event dataset is created based on an analysis of information about location and time of at least one of the plurality of user uploaded media content files.

7. The method of claim 1, wherein the individual event is defined by a first value setting plurality of different locations and a second value defining a common timing.

8. The method of claim 1, wherein the event dataset is created based on an analysis of a plurality of search queries submitted by a plurality of users.

9. The method of claim 1, wherein the web document is a webpage.

10. The method of claim 1, wherein the analyzing of the content of the web document comprises a natural language processing.

11. The method of claim 1, wherein the analyzing of the content of the web document is induced by the web document being loaded by the browser.

12. The method of claim 1, further comprising iteratively updating the event dataset with up-to-date multi participant events.

13. A non-transitory computer readable medium comprising computer executable instructions adapted to perform operations comprising:
receiving, at an enhancement network node from a browser extension of a browser running on a client terminal, a request for content enhancement of a web document being currently displayed at the client terminal via the browser, the web document being provided to the client terminal by a third-party content network node, the request comprising a universal resource locator that identifies the web document, the request being induced by the web document being loaded by the browser;
in response to the request:
accessing the web document using the universal resource locator;
analyzing a content of the accessed web document to extract a set of features from the web document, the analyzing the content in the web document comprising a natural language processing;
using a machine learning process to classify the set of features to generate a set of classified features;
selecting a set of candidate events by matching the set of classified features with one or more features of events described in an event dataset, the event dataset is created based on an analysis of a plurality of search queries submitted by a plurality of users;
generating a ranked set of candidate events by ranking each candidate event, in the set of candidate events, based on relevancy of a set of event features of the candidate event to the web document; and
identifying an individual event from the ranked set of candidate events;

identifying a group of user uploaded media content files, in a plurality of user uploaded media content files, by matching at least one feature of the individual event with at least one event indicating tag associated with an uploaded media content file in the plurality of user uploaded media content files, the identifying of the group of user uploaded media content files comprising:
  assigning individual user uploaded media content files of the plurality of user uploaded media content files to clusters according to an analysis of the at least one event indicating tag to yield a plurality of clusters, the group of user uploaded media content files being selected from the plurality of clusters;
forwarding, from the enhancement network node to the browser extension of the browser running on the client terminal, at least one media content file of the group of user uploaded media content files, the browser extension being configured to cause a simultaneous presentation of the at least one media content file on the browser with the web document, the simultaneous presentation of the at least one media content file being separate from presentation of the web document by the browser, and the simultaneous presentation being implemented as an overlay displayed over a part of the presentation of the web document;
iteratively updating a dataset documenting the plurality of user uploaded media content files with one or more new user uploaded media content files;
updating the group of user uploaded media content files by repeating the identifying of the group of user uploaded media content files with the one or more new user uploaded media content files; and
forwarding at least one media content file of the updated group to the simultaneous presentation.

14. An enhancement network node, comprising:
a database that hosts an event dataset documenting a plurality of multi participant events, each of the plurality of multi participant events being held in a geographical venue that hosts a plurality of participants;
at least one processor;
a web document analyzer that uses the at least one processor to:
  access the web document using a universal resource locator, the universal resource locator being included in a request from a browser extension of a browser running on a client terminal, the request being generated in response to the browser loading the web document;
  analyze a content of the accessed web document to extract a set of features from the web document; and
  using a machine learning process to classify the set of features to generate a set of classified features; and a selection module that uses the at least one processor to:
  select a set of candidate events by matching the set of classified features with one or more features of events described in an event dataset;
  generate a ranked set of candidate events by ranking each candidate event, in the set of candidate events, based on relevancy of a set of event features of the candidate event to the web document;
  identify an individual event from the ranked set of candidate events;
  identify a group of user uploaded media content files, in a plurality of user uploaded media content files, by matching at least one feature of the individual event with at least one event indicating tag associated with an uploaded media content file in the plurality of user uploaded media content files, the identifying of the group of user uploaded media content files comprising:
    assigning individual user uploaded media content files of the plurality of user uploaded media content files to clusters according to an analysis of the at least one event indicating tag to yield a plurality of clusters, the group of user uploaded media content files being selected from the plurality of clusters;
  iteratively updating a dataset documenting the plurality of user uploaded media content files with one or more new user uploaded media content files; and
  updating the group of user uploaded media content files by repeating the identifying of the group of user uploaded media content files with the one or more new user uploaded media content files; and
client interface module that uses the at least one processor to:
  receive the request from the browser extension;
  forward to the browser extension of the browser running on the client terminal, in response to the request, at least one media content file of the group of user uploaded media content files, the browser extension being configured to cause a simultaneous presentation of the at least one media content file on the browser with the web document, the simultaneous presentation of the at least one media content file being separate from presentation of the web document by the browser, and the simultaneous presentation being implemented as an overlay displayed over a part of the presentation of the web document; and
  after the updating of the group of user uploaded media content files, forwarding at least one media content file of the updated group to the simultaneous presentation.

15. The enhancement network node of claim 14, wherein the analyzing of the content in the web document is induced by the web document being loaded by the browser.

16. The enhancement network node of claim 14, wherein the event dataset is created based on an analysis of a plurality of search queries submitted by a plurality of users.

17. The enhancement network node of claim 14, wherein the event dataset is created based on an analysis of information about location and time of at least one of the plurality of user uploaded media content files.

18. The enhancement network node of claim 14, wherein the individual event is defined by a first value setting plurality of different locations and a second value defining a common timing.

* * * * *

UNITED STATES PATENT AND TRADEMARK OFFICE
CERTIFICATE OF CORRECTION

PATENT NO. : 11,625,443 B2
APPLICATION NO. : 14/730336
DATED : April 11, 2023
INVENTOR(S) : Rotem et al.

It is certified that error appears in the above-identified patent and that said Letters Patent is hereby corrected as shown below:

On the Title Page

On page 3, in Column 2, under "U.S. Patent Documents", Line 55, delete "2007/0092668" and insert --2017/092668-- therefor On page 4, in Column 1, under "U.S. Patent Documents", Line 13, delete "2008/0021421" and insert --2008/0214210-- therefor On page 4, in Column 1, under "U.S. Patent Documents", Line 40, delete "2009/0008971" and insert --2009/0089710-- therefor On page 5, in Column 1, under "U.S. Patent Documents", Line 7, delete "2012/0001651" and insert --2012/0165100-- therefor In the Claims In Column 17, Line 52, in Claim 14, after "and", insert a linebreak Signed and Sealed this
Thirtieth Day of July, 2024

Katherine Kelly Vidal
*Director of the United States Patent and Trademark Office*